US012360509B2

(12) United States Patent
Szipka et al.

(10) Patent No.: US 12,360,509 B2
(45) Date of Patent: Jul. 15, 2025

(54) MEASUREMENT SYSTEM, AND A METHOD IN RELATION TO THE MEASUREMENT SYSTEM

(71) Applicants: Károly Szipka, Tullinge (SE); Andreas Archenti, Älvsjö (SE)

(72) Inventors: Károly Szipka, Tullinge (SE); Andreas Archenti, Älvsjö (SE)

(*) Notice: Subject to any disclaimer, the term of this patent is extended or adjusted under 35 U.S.C. 154(b) by 660 days.

(21) Appl. No.: 17/421,604

(22) PCT Filed: Jan. 14, 2020

(86) PCT No.: PCT/SE2020/050029
§ 371 (c)(1),
(2) Date: Jul. 8, 2021

(87) PCT Pub. No.: WO2020/149780
PCT Pub. Date: Jul. 23, 2020

(65) Prior Publication Data
US 2022/0075342 A1  Mar. 10, 2022

(30) Foreign Application Priority Data

Jan. 18, 2019 (SE) .................................... 1930015-1
May 3, 2019 (SE) .................................... 1950528-8

(51) Int. Cl.
*G05B 19/404* (2006.01)
*G01P 3/44* (2006.01)
*G01P 15/08* (2006.01)

(52) U.S. Cl.
CPC .............. *G05B 19/404* (2013.01); *G01P 3/44* (2013.01); *G01P 15/0802* (2013.01); *G05B 2219/37388* (2013.01); *G05B 2219/37581* (2013.01)

(58) Field of Classification Search
CPC ........ B23Q 17/22; B23Q 17/00; B23Q 17/12; B23Q 17/2233; B23Q 2717/00;
(Continued)

(56) References Cited

U.S. PATENT DOCUMENTS 5,834,623 A   11/1998  Ignagni
8,401,691 B2   3/2013  Smith et al.
(Continued)

FOREIGN PATENT DOCUMENTS

CN    102245349 A    11/2011
CN    105881099 A    8/2016
EP      3059548 A1    8/2016

OTHER PUBLICATIONS

International Search Report and Written Opinion of the International Searching Authority for corresponding International Patent Application No. PCT/SE2020/050029, dated Apr. 21, 2020.
(Continued)

*Primary Examiner* — Lisa M Caputo
*Assistant Examiner* — Carter W Ferrell
(74) *Attorney, Agent, or Firm* — Renner, Otto, Boisselle & Sklar, LLP.

(57) ABSTRACT

A measurement system configured to determine an apparatus parameter related to a working procedure of an apparatus involving movements. The system includes a measurement unit including a sensor member configured to measure accelerations and generate a sensor signal in dependence thereto, and to apply the signal(s) to a processing unit. The measurement unit is configured to be arranged at the apparatus such that the measurement unit, during a measurement procedure, is repetitively moved in a loop, displaying a loop trajectory, in both forward and backward directions along the loop trajectory, and to perform measurements of accelerations during the measurement procedure. The processing
(Continued)

unit is configured to determine an apparatus parameter of working procedure movements which are indicated in the measured accelerations, and only based upon the measured accelerations, and configured to calculate a measure of the apparatus parameter only based upon one or many parameters of the accelerations.

20 Claims, 6 Drawing Sheets

(58) Field of Classification Search
CPC ........ B23Q 5/40; G05B 19/19; G05B 19/404; G05B 2219/37388; G05B 19/401; G05B 2219/49181; G05B 2219/37193; G05B 2219/37392; G05B 21/042; G05B 21/045; G05B 5/008
See application file for complete search history.

(56) References Cited

U.S. PATENT DOCUMENTS

| | | |
|---|---|---|
| 9,144,869 B2 | 9/2015 | Sato et al. |
| 2003/0056147 A1* | 3/2003 | Yutkowitz .............. G05B 11/28 714/25 |
| 2011/0246132 A1* | 10/2011 | Sato ....................... G05B 19/19 702/150 |
| 2014/0025195 A1 | 1/2014 | Ahmadpour |
| 2016/0236313 A1* | 8/2016 | Pettersson ................ G01B 7/14 |
| 2017/0023604 A1* | 1/2017 | Kourogi .................. G01P 13/00 |
| 2018/0094946 A1* | 4/2018 | Vogl ....................... G01P 15/18 |
| 2018/0133860 A1 | 5/2018 | Fujita et al. |
| 2018/0283858 A1* | 10/2018 | Uhl ........................ G01B 5/008 |
| 2019/0011327 A1 | 1/2019 | Phommasith |
| 2021/0207938 A1* | 7/2021 | Ould ...................... G01B 5/016 |

OTHER PUBLICATIONS

Fu Guoqiang, et al, "Squareness error modeling for multi-axis machine tools via synthesizing the motion of the axes," The International Journal of Advanced Manufacturing Technology, Springer, London, vol. 89, No. 9. Aug. 13, 2016, pp. 2993-3008, XP036198413.
Office Action issued for corresponding Chinese Application No. 202080009818.3, issued May 31, 2024.
Office Action issued by the Indian Intellectual Property Office for corresponding Indian Application No. 202127027322, mailed Jan. 20, 2023.
Office Action Issued by the Chinese Intellectual Property Administration for corresponding Chinese National Stage Application No. CN 202080009818.3, issued Oct. 15, 2024.
Office Action issued by the Brazilian National Institute of Industrial Property for related National Phase Application No. BR112021013877-3, dated Apr. 11, 2025.

* cited by examiner

MEASUREMENT SYSTEM, AND A METHOD IN RELATION TO THE MEASUREMENT SYSTEM

This application is a national phase of International Application No. PCT/SE2020/050029 filed Jan. 14, 2020, which claims priority of Swedish Patent Application No. 1930015-1 filed Jan. 18, 2019, and Swedish Patent Application No. 1950528-8 filed May 3, 2019, all of which are incorporated herein by reference.

TECHNICAL FIELD

The present disclosure relates to a measurement system, and to a method in relation to a measurement system, capable of determining a measure reflecting at least one apparatus parameter related to working procedure movements performed by an apparatus. The measure may reflect e.g. performance degradations, squareness errors, etc. and may also be applied to improve the performance of the apparatus, e.g. by calibration or tuning.

BACKGROUND

In many contexts, industry uses various types of machines for moving, processing and manufacturing various parts. This involves the need to be able to monitor the status of such machines in order, for example, to be able to do repairs and adjustments in time to avoid downtime or loss of accuracy of parts being manufactured. The objective is to detect machine parameters and their changes through a measurement solution which can be integrated into machinery and can enable flexible measurement automation. This leads to an affordable periodic monitoring possibility for machine parameters. This updated information on machine status and capability can support decision to reach higher effectiveness and resource utilization for example by preventing expensive faults.

The importance to increase productivity and quality in manufacturing leads to higher requirements on controllability of industrial machinery. In case of a machine tool or an industrial manipulator, this leads to the need to integrate more measurement systems into such equipment and implement measurements more frequently. The axes of machine tools and industrial manipulators enable relative motion of equipment components in the global coordinate system of such equipment. However, due to the e.g. assembly errors, installation or operational usage of these equipment the actual performance will deviate from the nominal one. This deviation is time and operation dependent as the components involved in the movement of the axis degrade due to wear and tear. This leads to loss of equipment accuracy and might lead to equipment breakdowns. Integrated measurements together with proper signal processing and analysis allow advanced operation and predictive maintenance of these equipment.

A current practice comprises the use of a special instrument, a so-called "ballbar", fitted between workpiece holders and tool holders, to test the machine's ability to perform a circular movement. Measuring equipment in the instrument is used to record deviations from a circle. Various such tests can be carried out at different time instances and results can be compared to provide information on various machine parameters, such as circularity, servo response, rectilinearity, play etc. Tests can also be done at various feed rates, in various feed directions and using bars of various lengths, and placing the workpiece holder at various different locations in the workspace of the system. There nevertheless remains the disadvantage of the inflexibilities and not being possible to automate measurements.

The European patent EP-3059548 relates to a method for determining machine parameters of a mechanical device in which a first element and a second element are mutually movable in settable patterns of movement. By determining a difference between a nominal movement path and an actual movement path, machine parameters indicating a condition of the mechanical device, may be determined.

US-2018/094946 is another patent document disclosing relevant background technology, and relates to an inertial measurement unit (IMU) that determines performance degradation of a linear axis and includes an accelerometer that, when disposed on a motion member of the linear axis including the motion member and a base member measures acceleration of the motion member, and provides a displacement of the motion member in response to movement of the motion member. The inertial measurement unit also includes a rate gyroscope that measures an angular rate of movement of the motion member; and provides a yield angle for the motion member in response to movement of the motion member, wherein the displacement and yield angle determine performance degradation of the linear axis based on an error in linear movement of the motion member along the base member.

U.S. Pat. No. 8,401,691 provides a dynamic metrology methods and systems for periodically determining an actual position of one or more of a machine and a tool with respect to a workpiece using one or more laser interferometers, and MEMS accelerometers.

U.S. Pat. No. 9,144,869 relates to a machine motion trajectory measuring device, including accelerometers, for measuring the motion trajectory of a machine used in an apparatus which controls the position of the machine.

U.S. Pat. No. 5,834,623 relates to apparatus and method to provide high accuracy periodic calibration of angular errors in a numerically controlled machine tool.

US-2018/0133860 relates to a motion trajectory measuring apparatus including a three-axis acceleration sensor measuring acceleration of a motion-trajectory measurement subject and outputting the result as an acceleration sensor signal.

The presently known solutions has often proven quite satisfactory results when applied in specific environments, however there is still room for achieving a more automatized, robust, and affordable solution. These known approaches are sensitive for the misalignment of sensors with respect to the axis motion direction, with respect to the coordinate system of the machinery, or with respect to each other (if there is more than one sensor). The uncertainty in alignment was one of the important disablers in order to use accelerometers for accurate motion trajectory measurement. Furthermore, in some of these known solutions position signals are also required from the machinery in order to perform the calculations.

The object of the present invention is to achieve a measurement system with improved and novel capabilities, and a method in relation to the measurement system, where the improvement lies in a higher accuracy, robustness, and user-friendliness, and a broader scope of application, e.g. for identification and monitoring of performance degradation, error detection, change in operational behavior, and calibration, and monitoring, in comparison to the currently applied systems and methods.

SUMMARY

The above-mentioned objects are achieved, or at least mitigated, by the present invention according to the independent claims.

Preferred embodiments are set forth in the dependent claims.

According to a first aspect the present invention relates to a measurement system (2) configured to determine at least one apparatus parameter related to a working procedure of an apparatus (4) involving movements, the system (2) comprises a processing unit (6) and at least one measurement unit (8) configured to be arranged at said apparatus (4) and to measure movements related to the working procedure. The at least one measurement unit (8) comprises at least one sensor member (10) configured to measure at least accelerations, and to generate at least one sensor signal (12) in dependence thereto, and to apply said signal(s) (12) to said processing unit (6). Furthermore, the at least one measurement unit (8) is configured to be arranged at said apparatus (4) such that the at least one measurement unit (8), during a measurement procedure, is repetitively moved in a loop (14), displaying a loop trajectory, in both forward and backward directions along the loop trajectory (14), and to perform measurements of at least accelerations during said measurement procedure, wherein said processing unit (6) is configured to determine said at least one apparatus parameter of working procedure movements which are indicated in said measured at least accelerations, and only based upon said measured at least accelerations, wherein said processing unit (6) is configured to calculate a measure of said at least one apparatus parameter only based upon one or many parameters of said accelerations.

According to a second aspect the present invention relates to a method in relation to a measurement system (2) configured to determine at least one apparatus parameter related to a working procedure of an apparatus (4) involving movements.

The method comprises:
arranging at least one measurement unit (8), comprising at least one sensor member (10), at said apparatus (4);
measuring movements related to the working procedure, by measuring at least accelerations, and
generating at least one sensor signal (12) in dependence thereto, and applying said signal(s) (12) to a processing unit (6), The method step of arranging said measurement unit at said apparatus (4) comprises arranging the measurement unit such that the at least one measurement unit (8), during a measurement procedure, is repetitively moved in a loop (14), displaying a loop trajectory in both forward and backward directions along the loop trajectory (14).

The method further comprises:
performing measurements of at least accelerations during said measurement procedure,
determining said at least one apparatus parameter of working procedure movements which are indicated in said measured at least accelerations, and only based upon said measured at least accelerations, and
calculating a measure of said at least one apparatus parameter only based upon one or many parameters of said accelerations.

The measurement system and the related method according to the present invention have a number of advantages in comparison to presently applied technique, some of these advantages are listed below.

High level of flexibility is represented in the selection of measurement parameters when implementing the measurement system disclosed herein, e.g.: characterized range, shape of the loop trajectory, used speeds, number of repetitions, sensors with lower accuracy requirements, i.e. cheaper sensors, may be used.

Due to the advantageous composition of the applied method utilizing loop motion, important parameters related to the alignment between sensor-equipment coordinate system or sensor-sensor can be compensated. In this way the accuracy of the sensor reading can be significantly increased and enhanced measurement of machine parameters can be reached.

The measurement unit may be integrated into the apparatus, e.g. into the machine tool.

The measurement system may be generally applied (and embedded) not just for machine tools but also for industrial robots.

If integrated into equipment, there is limited or no need for trained specialists to perform measurement procedures as the implementation can be automatized.

The measurement unit can be used independently from the movement controller of the measured apparatus.

The cost of the measurement system is lower than the presently used equipment, e.g. laser-based equipment.

The method can be utilized for measuring synchronised motion of at least two linear or at least one rotary axis or joint of an equipment.

The measurement is flexible in the selection of the number of repetitions. From quick time effective measurements, with low number of repetitions, more detailed and accurate measurements can be performed with increased number of repetitions. This can save important downtime of machines in production.

The measurement procedure is similar to a typical warm up cycle of machine tools or industrial manipulators, therefore it can directly utilize the warm-up cycle of these machines.

In many cases there are smaller or bigger incidents or accidents in production and a quick check can help to determine if the production can restart or not.

DETAILED DESCRIPTION

The measurement system, and also the method, will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
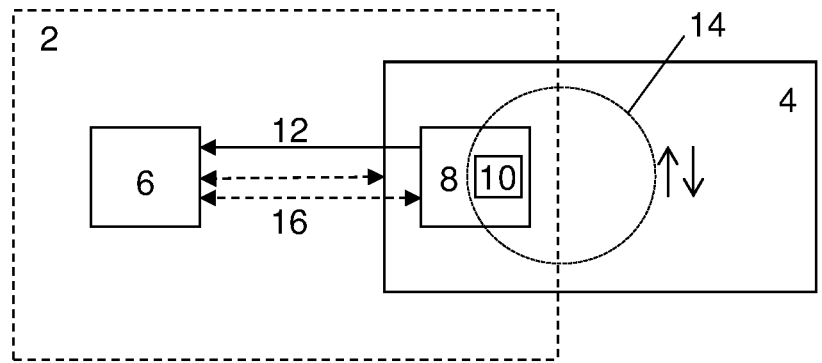
FIG. 1 is a schematic block diagram illustrating the measurement system according to the present invention.

With references to the schematic illustration shown in FIG. 1, a measurement system 2 is provided. The measurement system is configured to determine at least one apparatus parameter related to a working procedure of an apparatus 4 involving movements.

The apparatus 4 may be a machine, a machine tool, a production equipment, an industrial robot, etc., being capable of performing a working procedure involving movements.

The system 2 comprises a processing unit 6 and at least one measurement unit 8. The at least one measurement unit 8 is configured to be arranged at the apparatus 4 and to measure movements related to the working procedure.

The at least one measurement unit 8 comprises at least one sensor member 10 configured to measure at least accelerations, and to generate at least one sensor signal 12 in dependence thereto, and to apply the signal(s) 12 to the processing unit 6.

The processing unit and the at least one measurement unit are configured to communicate with each other either via a cable or wirelessly. The units are provided with communication capabilities supporting the used type of communication, e.g. short range radio frequency communication, e.g. Bluetooth, if wireless communication is applied. The processing unit may be embodied by one single unit or may comprise many decentralized subunits, and has the necessary processing performance and memory capabilities to perform all calculation, communication, etc. required with regard to the specific application the system is intended to be operated in. As an example, one subunit may be provided for data acquisition purposes, and another subunit for performing calculation and processing.

The at least one measurement unit 8 is configured to be arranged at said apparatus 4 such that the at least one measurement unit 8, during a measurement procedure, is repetitively moved in a loop 14, displaying a loop trajectory, in both forward and backward directions along the loop trajectory 14, which in the illustrated example is a circle, and to perform measurements of at least accelerations during the measurement procedure. The processing unit 6 is preferably configured to generate a measurement initiation signal 16 to be applied to the apparatus in order to instruct the apparatus to perform movements related to the measurement procedure, i.e. to instruct a controller of the apparatus to generate and apply relevant control instructions to various parts of the apparatus to perform the movements related to the measurement procedure. According to another variation, the apparatus 4 may be configured to generate a measurement initiation signal 16 to be applied to the processing unit 6 in order to instruct the processing unit 6 to initiate the measurements of the performed movements of the apparatus 4. In still another variation, various information related to the measurement procedure may be exchanged between the measurement unit 8 and the processing unit 6. These optional signals 16 are indicated by dashed lines in FIG. 1.

Figure 5:
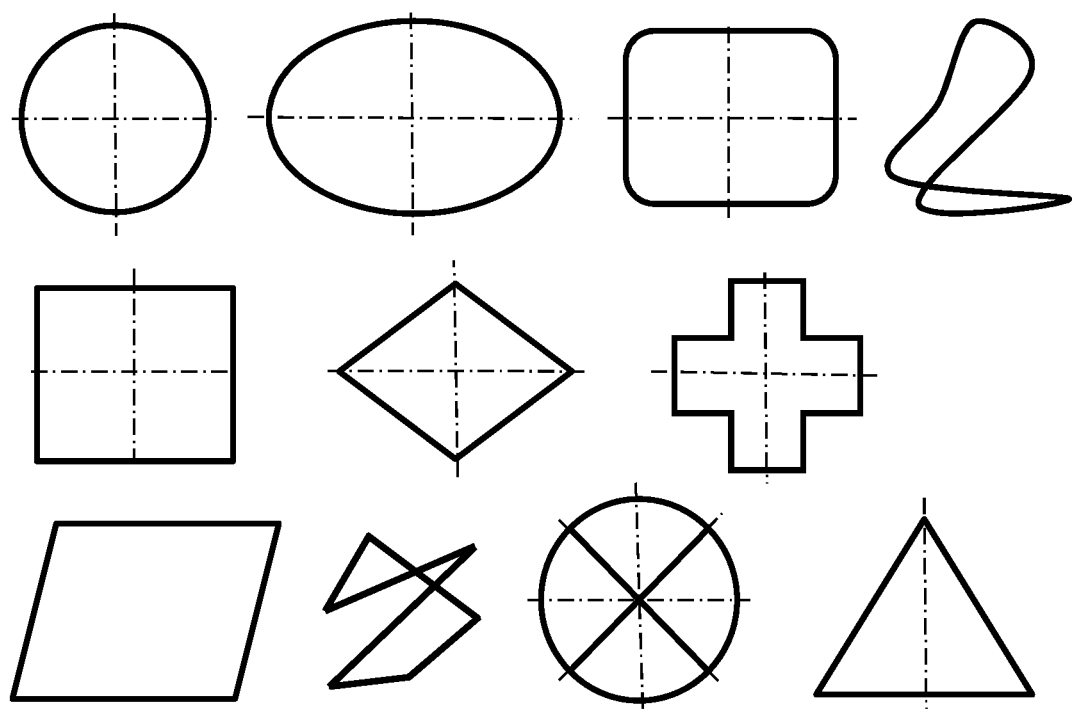
FIG. 5 shows various examples of 2D shapes of the loop trajectories.
Figure 6:
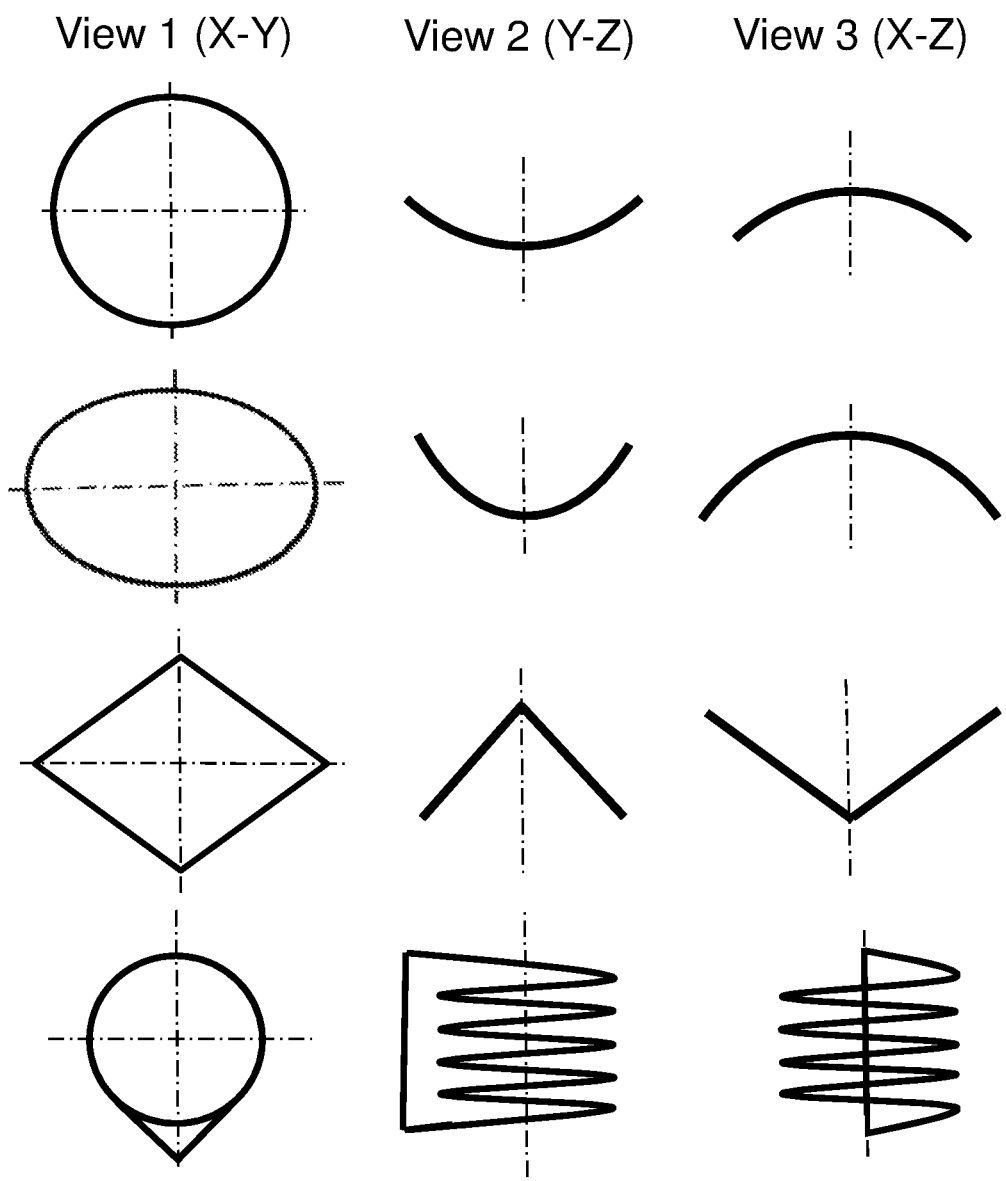
FIG. 6 shows various examples of 3D shapes of the loop trajectories.

A loop is generally defined as having a loop trajectory that has a shape that bends around and crosses itself. In one embodiment the loop is a circle, or an ellipse. Other examples of loop trajectory shapes are: a rectangle, a square, and more complex loop trajectories, etc. The loop defined by the loop trajectory has a two- or three-dimensional shape. Various examples of 2D- or 3D-shaped loops are shown in FIGS. 5 and 6.

During a measurement procedure, and thus during the repetitive movement of the measurement unit along and around the loop trajectory, the orientation of the measurement unit can be the same, for instance in case of the measurements of synchronized linear axes, or can change for instance in case of the measurement of a rotary axis.

During the measurement procedure, the measurement unit is rigidly mounted to the apparatus.

The processing unit 6 is configured to determine the at least one apparatus parameter of working procedure movements which are indicated in the measured at least accelerations of the at least one measurement unit 8, and based upon only the measured at least accelerations, and that the processing unit 6 is configured to calculate a measure of the at least one apparatus parameter only based upon one or many parameters of the accelerations.

The measurement unit may be arranged in a box that is provided with attachment means to attach the box to the apparatus. In one variation the box may also include the processing unit, i.e. the box is a self-sufficient unit capable of performing all necessary measurements, and calculations, and is then also provided with an energy supply, e.g. a battery.

Thus, the at least one measurement unit 8, during the measurement procedure, is repetitively moved in both forward and backward directions along the loop trajectory 14.

The number of repeated movements may naturally vary, but a higher number of repetitions will increase the accuracy of the measurements. In one variation one measurement procedure comprises approximately the same predetermined number of forward and backward loops which are executed subsequently.

According to one embodiment the processing unit 6 is configured to determine the at least one apparatus parameter of working procedure movements based upon motion components, e.g. deviations and/or errors, in loop movements.

The apparatus parameters comprise performance insufficiencies, degradations (e.g. wear and corrosion on apparatus components), calibration parameters, geometric errors (e.g. squareness, straightness, etc.), thermal deformations, inertial load induced deformations or motion control errors (servo mismatch, etc.) of the apparatus.

In a further embodiment the at least one sensor member 10 is also configured to measure angular rates, and to generate at least one sensor signal 12 in dependence thereto, and to apply said at least one sensor signal 12 to the processing unit 6. The at least one measurement unit 8, during a measurement procedure, is configured to perform measurements of angular rates and accelerations during the measurement procedure. The processing unit 6 is then configured to determine the at least one apparatus parameter of working procedure movements which are indicated in the measured accelerations and the measured angular rates of the measurement unit 8, and only based upon the measured accelerations and said measured angular rates. The processing unit 6 is configured to calculate a measure of the at least one apparatus parameter only based upon one or many parameters of the accelerations and the angular rates.

In one advantageous embodiment the sensor member 10 comprises a triaxle acceleration measurement arrangement, and a triaxle angular rate measurement arrangement, e.g. a triaxle gyroscope, to provide six degrees of freedom information along the loop trajectory.

Preferably, the one or many parameters of the accelerations, and if applicable also angular rates, is a phase shift between signals, acquired from at least two axes of said sensor member. The amplitude and/or frequency may be used from only one sensor member as well.

As both forward and backward movements around the loop has been performed, the acceleration signal, and if applicable also angular rate signal, comprises forward and backward datasets from the repetitive movements. The processing unit is then configured to perform the calculation by pre-processing the input acceleration signal, and if applicable also the angular rate signal, and then flipping one of the forward and backward datasets to match the corresponding positions of the two datasets. By matching the datasets, the alignment of a sensor member with respect to the apparatus axes and with respect to further sensor members can be compensated.

The loop motion of the apparatus axis or axes are realized on a nominal constant speed along the loop motion. The nominal constant speed is the speed which is a commanded input for the processing unit 6. Transient vibrations can affect the loop motions due to quick changes of axis directions. Even though, these vibrations can be also attributed with apparatus parameters, their effects can be handled, through the selection of the shape of the loop and/or selection of nominal speed.

In one embodiment in order to increase the accuracy of the measurement, the measurement procedure can be implemented on different speeds and may also utilizing different filtering to highlight the effect of corresponding spatial frequencies of deviations from nominal loop motion.

The inclination-term of gravity vector can be compensated in order to increase the accuracy of the measurement, especially in case of considering apparatus parameters related to the amplitudes of the sensor signals. Due to position dependent inclinations along the loop motion, the acceleration signal can be affected by the inclination of the gravitational vector. The inclination effect can be compensated for instance with the application of different speeds.

Filtering can be applied on the raw data in order to consider relevant spatial frequencies along the loop motion trajectory. Various phase-preserving filters, for instance low-pass, bandpass or high-pass filters can be applied to highlight apparatus parameters which are more relevant for the investigation. The frequencies selected for the filters are also related to the selected speeds for the implemented loop motion.

In one embodiment the processing unit 6 is configured to perform the calculation by applying a predetermined fit technique adapted to the type of loop and modelling of the effect of errors on the measured acceleration to connect the fit to actual apparatus parameter. If the loop is circular a sine-wave-fit technique is preferably applied to determine a frequency, and/or amplitude and/or phase and/or phase difference indicative of apparatus parameter.

In another embodiment the processing unit 6 is configured to perform the calculation by integration of the sensor signal 12 to gain displacement to characterize the apparatus parameters, and wherein two integrations are performed for accelerations and, if applicable, one integration is performed for angular rates.

Figure 3:
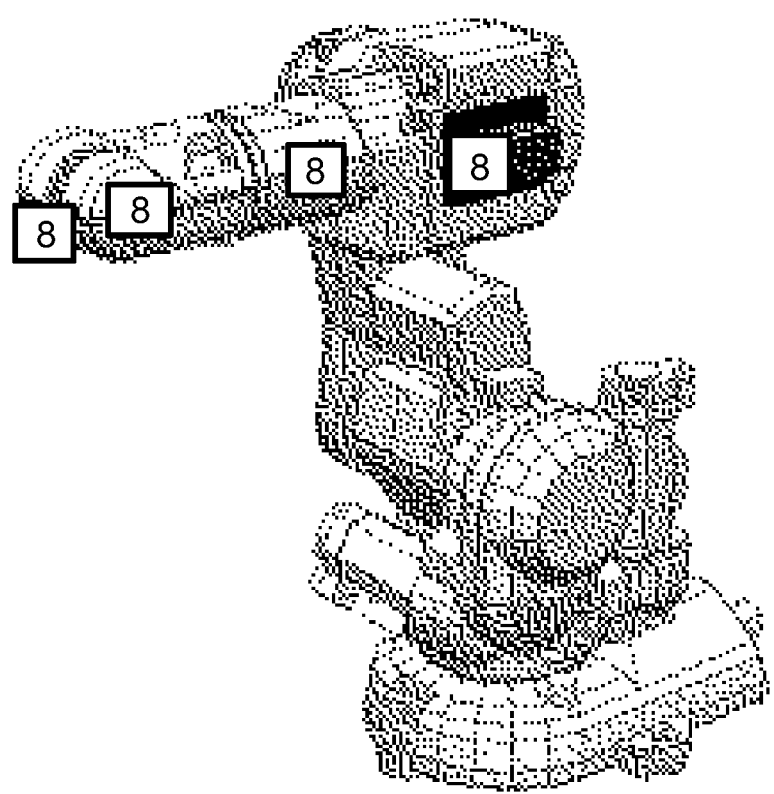
FIG. 3 is a perspective view of an industrial manipulator where the present invention is implemented.

FIG. 3 is a perspective view illustrating various mounting positions of a measurement unit 8 on or into an industrial manipulator. The measurement unit may be mounted on or integrated into an axis of an industrial manipulator; on or integrated into a joint and or a link of an industrial manipulator; on or integrated into the end effector of an industrial manipulator, and/or on or integrated into the mechanical interface of an industrial manipulator. Other mounting positions are naturally possible, e.g. on an object held by an end effector.

Figure 4:
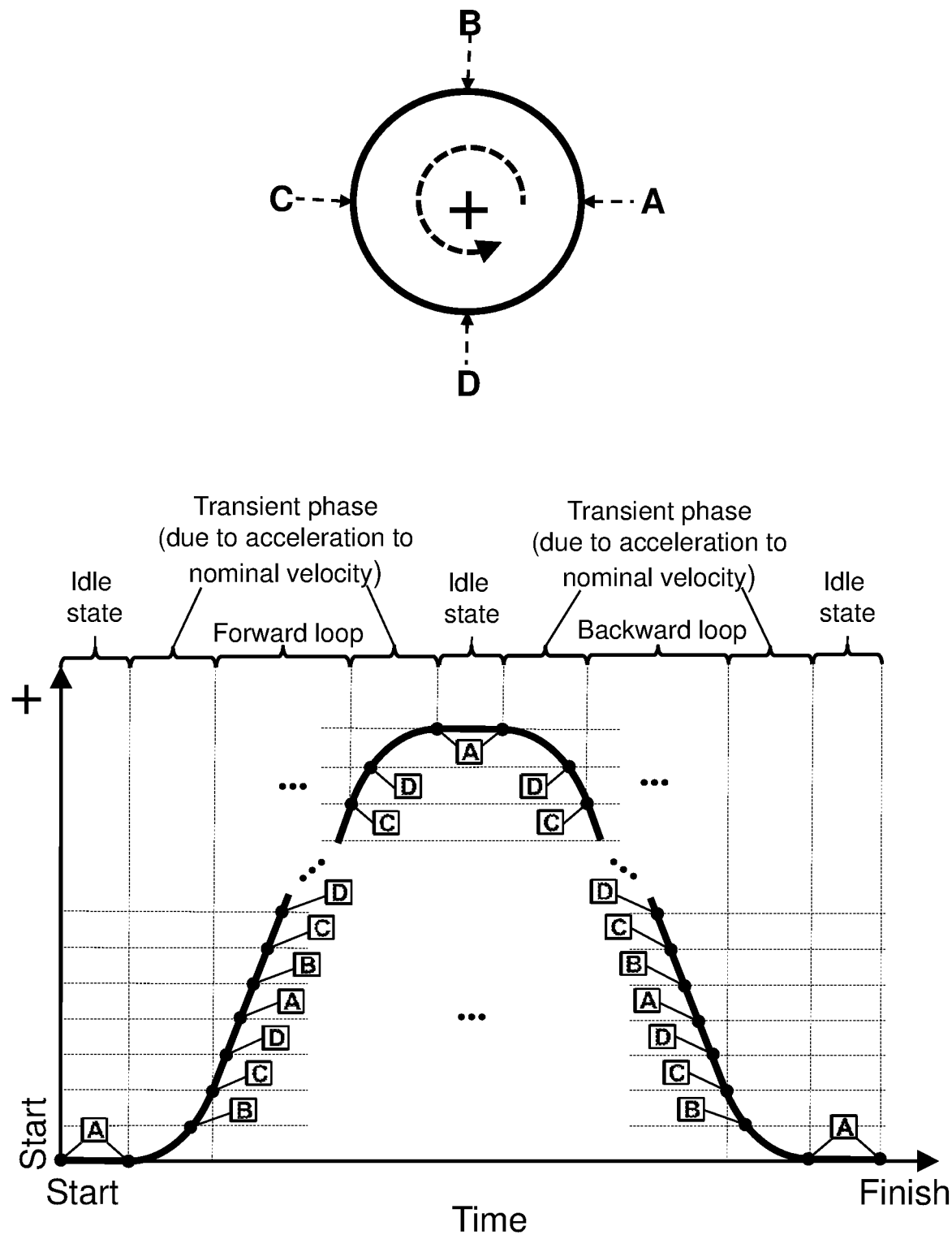
FIG. 4 shows a diagram illustrating variation in positions during movement along a loop trajectory in one exemplary illustration of one embodiment.

FIG. 4 shows a schematic diagram of one exemplary illustration of an operation sequence of implementing measurements for one run. For a commanded loop trajectory in the nominal velocity phase at least one repetitions of the commanded loop trajectory is implemented. In this example the loop is a circle which is shown at the top of the figure where the positions A-D are denoted. In one variation, without stopping the commanded motion several repetitions of the commanded loop trajectory can be implemented. To increase the accuracy of the measurement one run can be repeated several times. In order to eliminate the effect of the transient phase an overshoot can be applied, which in case of the exemplary operation is adjusted to be half of the circular trajectory.

Runs may also be implemented on more than one velocity level and on different nominal velocity levels. In the diagram the Y-axis designates the nominal travelled distance along the loop trajectory.

FIG. 5 shows various examples of 2D shapes of the loop trajectories; e.g. loop shape examples including smoother trajectories, and loop shape examples requiring sudden change of axis movement.

FIG. 6 shows various examples of 3D shapes of the loop trajectories shown from different views. Loop shape examples including smoother trajectories, and examples requiring sudden change of axis movement.

The present invention also relates to a method in relation to a measurement system 2 configured to determine at least one apparatus parameter related to a working procedure of an apparatus 4 involving movements. The measurement system has been described in detail above and it is herein referred to that description.

Figure 7:
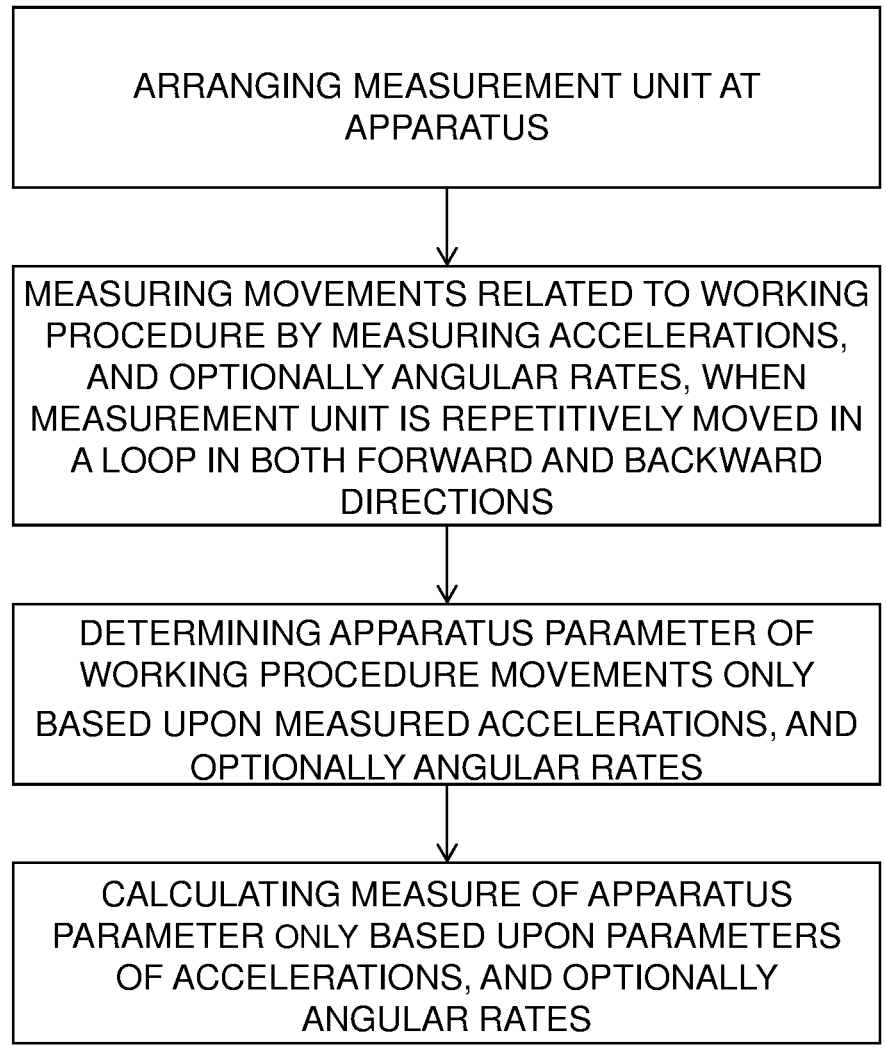
FIG. 7 is a schematic flow diagram of a method according to the present invention.

The method will now be described with references to the flow diagram shown in FIG. 7.

Thus, the method comprises:
arranging at least one measurement unit 8, comprising at least one sensor member 10, at said apparatus 4;
measuring movements related to the working procedure, by measuring at least accelerations, and
generating at least one sensor signal 12 in dependence thereto, and applying said signal(s) 12 to a processing unit 6.

The method step of arranging the measurement unit at the apparatus 4 comprises arranging the measurement unit such that the at least one measurement unit 8, during a measurement procedure, is repetitively moved in a loop 14, displaying a loop trajectory, in both forward and backward directions along the loop trajectory 14, the method further comprises:
performing measurements of at least accelerations during the measurement procedure,
determining the at least one apparatus parameter of working procedure movements which are indicated in said measured at least accelerations of said at least one measurement unit 8, and only based upon the measured at least accelerations, and
calculating a measure of the at least one apparatus parameter only based upon one or many parameters of the accelerations.

A loop is generally defined as having a loop trajectory that has a shape that bends around and crosses itself. In one embodiment the loop is a circle, or an ellipse. Other examples of loop trajectory shapes are: a rectangle, a square, etc.

Thus, the method comprises, during the measurement procedure, repetitively moving the measurement unit in both forward and backward directions along the loop trajectory 14.

Preferably, one measurement procedure comprises that essentially a same predetermined number of forward and backward loops are executed subsequently.

According to one embodiment the method comprises controlling the movement of the measurement unit along the loop such that a nominal constant speed is kept along the loop motion.

According to a further embodiment the method comprises:

measuring by the at least one sensor member 10 also angular rates during the measurement procedure, generating at least one sensor signal 12 in dependence thereto, and applying the at least one sensor signal 12 to the processing unit 6, the method further comprises:

determining the at least one apparatus parameter of working procedure movements which are indicated in the measured accelerations and the measured angular rates, and calculating a measure of said at least one apparatus parameter only based upon one or many parameters of said accelerations and said angular rates.

According to a further embodiment the sensor member 10 comprises a triaxle acceleration measurement arrangement, and a triaxle angular rate measurement arrangement, e.g. a triaxle gyroscope, and the method then comprises providing six degrees of freedom information along the loop trajectory.

The method preferably also comprises performing a pre-processing operation of the acceleration signal, and if applicable also angular rate signal. The signal(s) comprise forward and backward datasets from the repetitive movements, and the pre-processing of the input acceleration signal, and if applicable also the angular rate signal, comprises flipping one of the forward and backward datasets to match the corresponding positions of the two datasets.

In one embodiment the method comprises performing the calculation by applying a predetermined fit technique adapted to the type of loop and modelling of the effect of errors on the measured acceleration to connect the fit to actual apparatus parameter. If the loop is circular a sine-wave-fit technique is preferably applied to determine a frequency, and/or amplitude and/or phase difference indicative of apparatus parameter (e.g. squareness).

By way of example the method may also comprise performing the calculation by integration of the sensor signal to gain displacement to characterize the apparatus parameters, and wherein two integrations are performed for accelerations and, if applicable, one integration is performed for angular rates.

To further illustrate the advantages with the measurement system, and the method, and by way of example, the methodology, experimentation, data analysis, and validation and verification of an IMU-based and loop-based (e.g. circular or elliptical) measurement system and method will be disclosed in the following.

The disclosed system and method enables a robust identification of apparatus parameters and their change or degradation in time, e.g. squareness, under industrial conditions. The main steps include the optional simulation of motion components, including positions, velocities and accelerations, for both nominal and cases affected by errors—part (a), the implementation of tests and pre-processing of measurement data—part (b), and the data analysis in order to determine how an apparatus parameter, e.g. squareness—part (c).

Further tests, and real uses, of the measurement system require only the implementation of parts (b) and (c).

In an exemplary example, circular motion generated by two linear axes can be modeled as complex harmonic motion, following Lissajous formulation. The ideal accelerations in X and Y directions ($a_x$ and $a_y$) along a circular trajectory can be described with parametric equations:

$$(t)=A_x \cdot \cos(\omega_x t - \theta_x) + C_y \cdot \cos(\omega_y t + \pi/2 - \theta_y) \tag{1}$$

$$(t)=A_y \cdot \cos(\omega_y t + \pi/2 - \theta_y) + C_x \cdot \cos(\omega_x t - \theta_x) \tag{2}$$

In the above equations, $A_x$ and $A_y$ are the amplitudes, $\omega_x$ and $\omega_y$ are the frequencies, and $\theta_x$ and $\theta_y$ are the phase shifts for the X and Y directions respectively. The terms $C_x$ and $C_y$ are the vibration amplitudes resulting from misalignment between the sensor axes and the machine axes average motion, which can be expressed by $\varepsilon_c$. The relationship between the vibration amplitudes and the sensor misalignment is described in equation 3. It should be noted that the average axis motion is not known a priori.

$$\begin{bmatrix} C_x \\ C_y \end{bmatrix} = \begin{bmatrix} A_y \\ A_x \end{bmatrix} \cdot \tan(\varepsilon_c) \tag{3}$$

For a given radius and feed speed, the positions, velocities and accelerations including, $\omega_x$ and $\omega_y$ frequencies and $A_x$ and $A_y$ amplitudes of the accelerations can be calculated. Then, the effects of three main error sources were considered, including:

i) $\varepsilon_c$, the misalignment between the machine tool axes and the sensor axes due to setup inaccuracies (which determines $C_x$ and $C_y$), ii) $ES_{COX}$, the squareness of sensor axes and iii) $E_{COX}$, the squareness of the machine tool average axes Traditionally, homogenous transformation matrices (HTMs) are used to express the effects of these error sources on commanded positions. Taking the programmed feed speed into account, the time-dependent nominal positions are used as input to the HTMs to calculate corresponding time-dependent actual positions. Through differentiations, the effect of alignment errors can be derived on time-dependent acceleration. The calculated accelerations can then be related to the amplitude and phase-shift parameters in equation 1 and 2. Insertion of equation 3 into equation 1 and 2 yields expressions for the X- and Y-accelerations that depends on $\varepsilon_c$ misalignment. This relation of the amplitudes can also be confirmed through time-dependent HTMs. Such simulation of motion trajectories and the effect of different apparatus parameters on sensor signals can be simulated in case of different loop trajectories as well.

The squareness error results in two sinusoids for $a_x(t)$ and $a_y(t)$ with a phase difference between the two, in case of a circular loop trajectory. This confirms the analogy with the Lissajous curve, where the varying phase shift changes the aspect ratio of the resulting ellipse. Elliptical shape of the 'circular' position trajectory is widely accepted as the quantifiable characteristics of the squareness error between the two linear axes.

An important implication of the simulations is that the phase shift is attributed with $E_{COX}$ and $ES_{COX}$ (where X and Y are directions of a right-handed Cartesian coordinate system):

$$E_{COX} + ES_{COX} = \theta_y - \theta_x \quad (4)$$

The limitation is that the separation of the machine tool and the sensor axes squareness is difficult. However, with the application of forward and backward directions along the loop trajectory, after the flipping of the datasets to match the corresponding positions $ES_{COX}$ can be determined. Thus, $E_{COX}$ can be determined as well. Furthermore, the simulated magnitudes of the misalignment $\varepsilon_c$, which are realistic for the given alignment procedure, were found to negligibly affect the phase shift. This helps enable the phase shift of the acceleration signals to be a robust indicator for squareness. However, at the same time the misalignment $\varepsilon_c$ significantly effects the sensor amplitudes. Therefore, in case of an amplitude based investigation an important step is the determination and compensation of the misalignment. Important steps related to filtering of raw data and proper fitting of acceleration motion component parameters have to be implemented to detect values of $\theta_x$ and $\theta_y$.

This example shows the implementation of the method in case of a loop which has a circular shape and the considered sensor parameter is the phase shift between two sensor members.

Experimentation

Tests were performed under industrial conditions on a three-axis machine tool with axis traverse ranges of X: 1000 mm, Y: 510 mm, and Z: 561 mm. The kinematic chain of the machine is [t-(C)-Z-b-Y'-X'-w] where X and Y axes are stacked to represent the motion of the table.

Six levels of squareness, including the reference, were induced by mechanically changing the relation between X (upper) and Y (lower) axes. The procedure to change and measure squareness was performed as follows:
  (1) mechanically loosen the bolts that connect the carriages of the X and Y axes;
  (2) apply an external load to push the X axis out of its orientation with respect to Y, while keeping the Y axis fixed;
  (3) tighten bolts with a torque wrench, and
  (4) measure the induced squareness with a square block and a telescoping double ballbar (DBB). The square block and DBB data were used for validation and verification purposes.

In the experimentation—for a loop trajectory representing a circle-both the squareness of the machine axis, and the misalignment of the sensor members with respect to the machine axis were defined. This enables to consider and investigate the amplitude of the sensor signal as well as after the necessary integration of the signals to yield displacements from the nominal loop trajectory, which are attributed to further machine parameters.

Validation and Verification

Two standardized measurement approaches were used for validation and verification purposes. The square block was used to increase control over mechanical error inducement, and the DBB was selected as the second instrument because it is capable of measuring under similar conditions as the performed accelerometer-based tests (same radius of circle and feed). Ten repeated measurements were implemented both before and after error inducement, and the effect of warm up of the machine on the squareness was also investigated and found to be negligible.

There is a significant agreement between results of the IMU-based circular test and results of the two standardized tests. Thus, the introduced method is able to identify squareness values verified with the traditional measurement methods. Type A standard uncertainties of the IMU-based results are the outcome of convergence (for 155 runs). The validation and verification is limited by the differences in the principles of the approaches.

Conclusions and Discussions of Disclosed Exemplary Methodology

The squareness of multi-axis machine tools is directly linked to the quality of machined components. Herein a novel methodology is disclosed to measure squareness between machine tool axes. The procedure is based on inertial measurements in which triaxial accelerometer data is collected while the sensor moves along circular trajectories executed by the synchronized motion of two stacked linear axes. The methodology includes pre-processing of measurement data and data analysis to determine the squareness of two linear axes, and alignment of sensor members with respect to machine axes and with respect to each other.

The disclosed method is experimentally verified and validated under industrial conditions on a three-axis machine tool by comparing squareness values quantified by the IMU-based method with those from a conventional square block and telescoping ballbar. The results were well confirmed. The convergence of the mean value of the measurement quantity can be reached with the introduced approach. As the IMU can be integrated within a machine tool (eliminating the need for setup time), and it can be directly applied as warm up cycle, valuable production time can be saved.

The presented integration of sensors in advanced production equipment can facilitate the development of measurement automation towards the concept of self-diagnostics of machine tools. By integrating the data acquisition and analysis in the machine tool controller, compensation for process planning and optimization of maintenance can be performed by monitoring various machine parameters through periodic online measurements.

Figure 2:
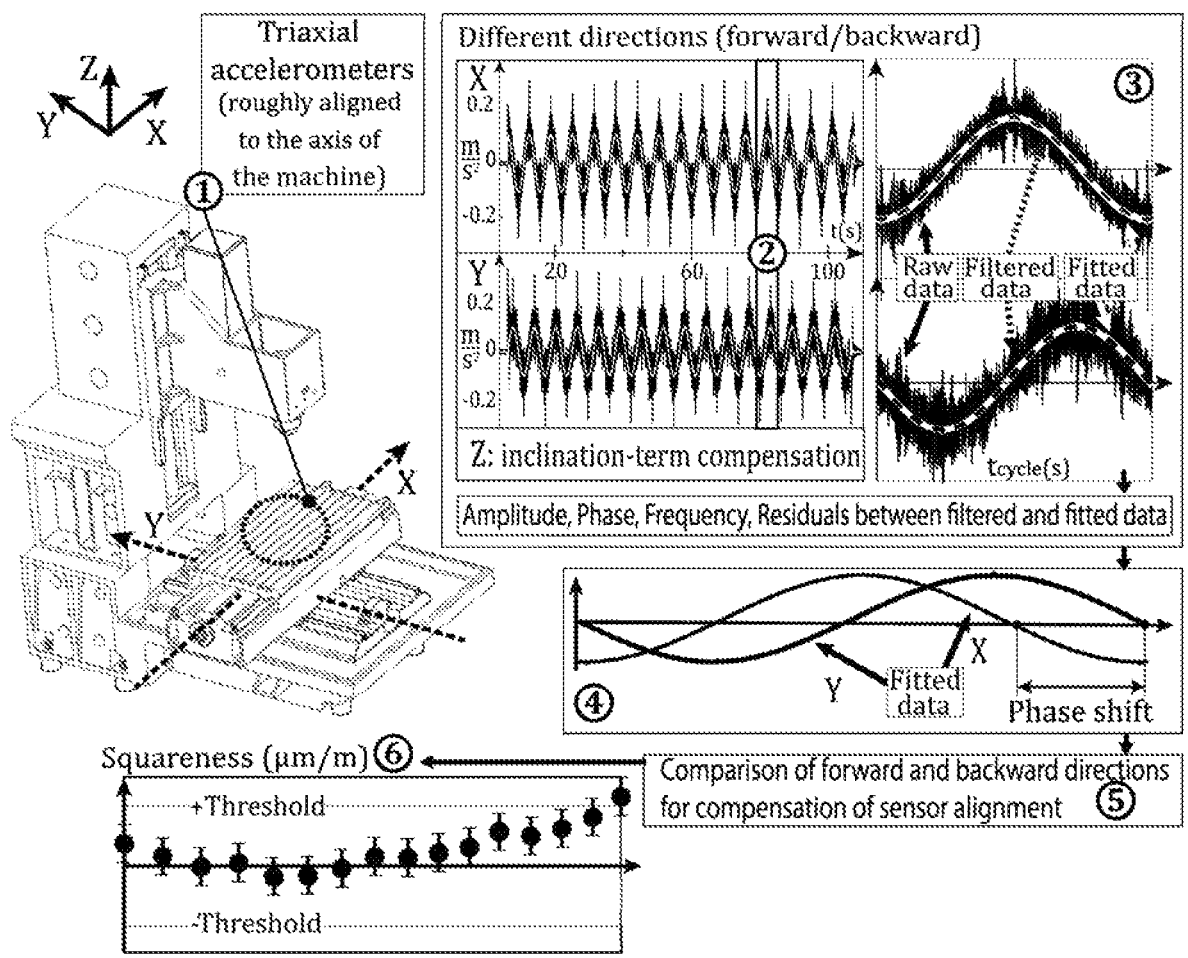
FIG. 2 illustrates various aspect of one embodiment of the present invention.

FIG. 2 outlines aspects of one embodiment of the present invention, in which two axes of a machine tool move an IMU (Step 1) in a nominally circular motion for an N-number of clockwise (CW) and counterclockwise (CCW) cycles. The acceleration data from the IMU is processed (Step 2-5) to yield squareness over time with the elimination of the need for double integration. The yielded squareness can be further used with thresholding to alert the manufacturer about machine tool performance degradation (Step 6).

Various aspects of the measurement system will now be further illustrated by way of examples included below.

Example 1

According to one illustrating example the measurement system comprises a sensor box with a triaxial accelerometer, being the measurement unit, a mounting for the sensor box, and a data acquisition unit, being an integral part of the sensor box, or is an external unit. The selection of sensors is crucial to reduce measurement uncertainty. The chosen accelerometer has a bandwidth of 0-300 Hz (corresponding to the half-power point), a nominal sensitivity of 2000 mV/g and a noise output of 7 μg rms/√Hz. The maximum value of the cross-axis sensitivity is 3%, which defines an upper bound estimate for the squareness $ES_{COX}$. The sensor box, including the accelerometers, was clamped in the middle of the X and Y axes and roughly aligned along T-slots of the table. Sensor data is collected while circular trajectories are executed by synchronized motion of two linear axes. The circular trajectories include repeated counterclockwise (CCW) and clockwise (CW) directions which are executed subsequently. For each of the six levels of squareness, acceleration data was collected for 155 runs, each composed of 30 cycles (15 CCW and 15 CW cycles). To have stable measurement conditions, an 180° overshoot at the beginning and end of each CCW or CW motion was implemented. This minimized transient vibrations for sufficient dynamic stability of the repeated cycles. Furthermore, before and after the CCW and CW directions a standing still period was commanded at the same position, which can be used for zero-offset and drift compensation.

Various radii and feed rates can be selected for the measurement procedure. However, it is important that in order to maximize the signal-to-noise ratio, a higher speed (resulting in higher accelerations) is desired. At the same time, the machine should be able to perform the trajectories with stability and without significant effects of the inertial forces. For tests disclosed herein, a nominal radius of 0.1 m and a feed of 0.1 m/s (or 6000 mm/min) was selected.

Example 2

In the following will be disclosed a measurement procedure, and in particular how the calculation is performed by the measurement system according to one embodiment of the present invention.

The measured accelerations are first pre-processed in order to prepare a dataset for fitting of harmonic motion components and determination of phase shift between the fitted X and Y accelerations. The pre-processing starts with the filtering of raw data, which is essential for detecting spatial frequencies relevant for squareness error. A first-order low-pass Butterworth filter (zero-phase) was used, with a cutoff frequency of 4 Hz. The cutoff frequency was selected to be sufficiently high in order to reasonably capture squareness, but low enough to prevent the sensitivity of the output quantity on other spatial frequencies. In other words, 4 Hz was selected through iterations during analysis of cutoff frequencies above 1 Hz, which is greater than the fundamental motion frequency of approximately 0.167 Hz. The last step in the pre-processing is the segmentation of repeated circular trajectories implemented in each run. After the segmentation, the acquired signals can be investigated without any change in the phase shift of the signals, but at the same time the effect of drift is minimized. Drift occurs when data is compared from a longer time interval. Drift was an important optimization criterion for the selection of a higher test speed to reduce the test time.

After pre-processing, CW and CCW data is compared in order to eliminate the effect of servo controller mismatch. Before that, however, the CW dataset has to be flipped in order to match corresponding positions with the CCW (positive) direction. As servo mismatch has similar distortion effect as squareness on a circular trajectory, therefore the acquisition of CW and CCW data is essential to separate the different sources. In the next step the acceleration data is fitted according to the motion component parameters defined in equation 1 and 2 with an additional constant term. The fit is implemented in two steps in order to yield $\theta_x$, $\theta_y$ and $C_y$, $C_x$ quantities. First, the first terms of equation 1 and 2 are fitted to the filtered measurement data with known frequency (0.167 Hz) to solve for $A_x$, $A_y$, $\theta_x$ and $\theta_y$. Second, the second terms of equation 1 and 2 are fitted to the residuals of the previous fit and $C_y$ and $C_x$ are determined. With known amplitudes through equation 3, a mean for $\varepsilon_c$ can be deduced (which in this experiment was identified to be 2.1°).

The sine-wave-fit technique is considered as one of the most powerful tools for phase difference measurement. A least-squares method was applied with bisquare weights for both fits. The application of robust fitting is important as peaks (due to the reversal of axes) can affect the results. However, it has to be noted, that these peaks included in the residuals between the fit and the pre-processed data can characterize important further machine parameters. The composed fitting strategy is the result of an optimization, which was implemented through observing the convergence of the mean and standard deviations of test data via different fitting strategies. For each run, a mean value of the repeated cycles is calculated. With this approach, the double integration to time-dependent position is avoided, which has important advantages to reduce the effect of noise during the quantification of squareness. However, double integration is needed for the investigation of angular or translational displacements in the loop trajectory, which are attributed with further apparatus parameters, e.g. machine parameters (such as for instance geometric errors of the machine, the degradations of involved axis or components, etc.).

The convergence of the mean values with increasing number of runs is essential in order to improve the quality of the characterized machine parameter and also to evaluate the quality of the implemented fits.

The test uncertainty can be further reduced by the compensation of thermal deformation of in the sensor members. In case of starting up measurements, the electronics of the sensors generates heat, resulting in a thermal deformation and in a slight change of squareness between the two sensor axes ($ES_{COX}$). This affects the characterization of the machine parameters. This phenomenon can be reduced by proper warm up of the sensor itself before measurement, and/or by compensation.

Example 3

The measurement unit comprises a triaxial accelerometer and a triaxial rate gyro. The sensors may be arranged in a sealed small sensor box to protect from industrial environment (e.g. cutting fluid and chips). The sensors are wired so a sealed wire comes out from the box and connects the sensors to a processing unit, i.e. a data acquisition unit with memory and processor. Or, the measurement unit is wirelessly connected to the processing unit, or directly connected to the apparatus control system or to any line control system. The data from this unit is shared with a server where the raw sensor data is processed to gain the necessary machine parameters. The sensor box is mounted on the moving rotary axis or linear axes of the machine (or the end effector of a robot arm) and from this rigid connection the setup can stream data.

The sensor box may be embedded below the functional parts of machines (e.g. in case of machine tools under the table) so it will not be interfering with main functionality of the system, as well as it can be used as an external unit and place it on the equipment only during measurements. One of the core part of the solution is the handling and analysis of the acquired data which is implemented in a software.

According to one embodiment of the method the following procedure is performed: standing idle (all machine axis are stopped), start and repeat the loop motion in forward direction several times, then stop and stay idle again for a few seconds, then implement the repeated loop motion in backward direction several times and stand still again. The standing idle phases of the measurement procedure can be used for zero offset compensation and/or compensation of the effect of drift in between the standing idle phases. Generally, the implemented loop can be a circle, which can have different radius, and different nominal speed.

The axes or axis of the sensor(s) should be roughly aligned as well as possible to the corresponding axes of the machine. However, the composed procedure is capable of the compensation of misalignment of sensor members. This is generally applicable to all embodiments disclosed herein. While the accelerometer is measuring acceleration in three dimensions (then it is integrated to velocity which is integrated to displacement) the rate gyro measures angular rate (which then is integrated to angular displacement).

An essential feature for achieving the effect is that the repeatability of the measured equipment/machine has to be on an acceptable range; the assumption is that the equipment roughly implements the same trajectory again and again.

The sensitivity, the noise level and bias of the sensors has to be selected carefully.

The present invention is not limited to the above-described preferred embodiments.

Various alternatives, modifications and equivalents may be used. Therefore, the above embodiments should not be taken as limiting the scope of the invention, which is defined by the appending claims.

The invention claimed is:

1. A measurement system configured to determine at least one apparatus parameter related to a working procedure of an apparatus involving movements, wherein said apparatus is one or more of a machine or a machine tool or a production equipment or an industrial robot, and wherein an apparatus parameter comprises performance insufficiencies, degradations, calibration parameters, geometric errors, thermal deformations, inertial load induced deformations or motion control errors of the apparatus, the system comprises:
a processing unit and
at least one measurement unit;
wherein said at least one measurement unit is configured to be arranged at said apparatus and to measure movements related to the working procedure, said at least one measurement unit comprises at least one sensor member configured to measure at least accelerations, and to generate at least one sensor signal in dependence thereto, and to apply said signal(s) to said processing unit,
wherein said at least one measurement unit is configured to be arranged at said apparatus such that the at least one measurement unit, during a measurement procedure, is repetitively moved in a loop, displaying a loop trajectory, in both directions of the loop, a forward direction along the loop trajectory, corresponding to a forward loop, and a backward direction along the loop trajectory, corresponding to a backward loop, such that, during the measurement procedure, multiple forward loops are executed, subsequently followed by executing multiple backward loops, and to perform measurements of at least accelerations during said measurement procedure,
wherein said processing unit is configured to determine said at least one apparatus parameter of working procedure movements which are indicated in said measured at least accelerations, and only based upon said measured at least accelerations,
and wherein said processing unit is configured to calculate a measure of said at least one apparatus parameter only based upon one or many parameters of said accelerations by applying a predetermined fit technique adapted to a type of the loop and modelling of an effect of errors on the measured acceleration.

2. The measurement system according to claim 1, wherein the movement of the measurement unit along the loop is such that a constant nominal speed is commanded along the loop motion.

3. The measurement system according to claim 1, wherein said processing unit is configured to determine said at least one apparatus parameter of working procedure movements based upon motion components in loop movements.

4. The measurement system according to claim 3, wherein the motion components upon which said processing unit is configured to determine said at least one apparatus parameter of working procedure are deviations and/or errors.

5. The measurement system according to claim 1, wherein said at least one sensor member is also configured to measure angular rates, and to generate at least one sensor signal in dependence thereto, and to apply said at least one sensor signal to said processing unit, wherein the at least one measurement unit, during a measurement procedure, is configured to perform measurements of angular rates during said measurement procedure, and wherein said processing unit is configured to determine said at least one apparatus parameter of working procedure movements which are indicated in said measured accelerations and said measured angular rates of said measurement unit, and only based upon said measured accelerations and said measured angular rates, and wherein said processing unit is configured to calculate a measure of said at least one apparatus parameter only based upon one or many parameters of said accelerations and said angular rates.

6. The measurement system according to claim 5, wherein said sensor member comprises a triaxle acceleration measurement arrangement and a triaxle angular rate measurement arrangement to provide six degrees of freedom information along the loop trajectory.

7. The measurement system according to claim 6, wherein said triaxle acceleration measurement arrangement is a triaxle accelerometer and/or said triaxle angular rate measurement arrangement is a triaxle gyroscope.

8. The measurement system according to claim 1, wherein said one or many parameters of said accelerations, and if applicable also angular rates, is a phase shift between signals, acquired from at least two axes of said sensor member(s).

9. The measurement system according to claim 1, wherein said loop trajectory has a shape that bends around and crosses itself.

10. The measurement system according to claim 9, wherein said loop trajectory is a circle or an ellipse.

11. The measurement system according to claim 1, wherein said processing unit is configured to perform said calculation by applying a predetermined fit technique adapted to the type of loop and modelling of the effect of errors on the measured acceleration to connect a fit, resulting from applying the predetermined fit technique, to an actual apparatus parameter.

12. The measurement system according to claim 1, wherein the at least one measurement unit is configured to move in a circular loop.

13. The measurement system according to claim 12, wherein the predetermined fit technique is a sine-wave-fit technique that is applied to determine a frequency, and/or amplitude and/or phase difference indicative of apparatus parameter.

14. A method in relation to a measurement system configured to determine at least one apparatus parameter related to a working procedure of an apparatus involving movements, wherein said apparatus is one or more of a machine or a machine tool or a production equipment or an industrial robot, and wherein an apparatus parameter comprises performance insufficiencies, degradations, calibration parameters, geometric errors, thermal deformations, inertial load induced deformations or motion control errors of the apparatus, the method comprises:

arranging at least one measurement unit, comprising at least one sensor member, at said apparatus;

measuring movements related to the working procedure, by measuring at least accelerations, and generating at least one sensor signal in dependence thereto, and applying said signal(s) to a processing unit, wherein said method step of arranging said measurement unit at said apparatus comprises arranging the measurement unit such that the at least one measurement unit, during a measurement procedure, is repetitively moved in a loop, displaying a loop trajectory, in both directions of the loop, a forward direction along the loop trajectory, corresponding to a forward loop, and a backward direction along the loop trajectory, corresponding to a backward loop, such that, during the measurement procedure, multiple forward loops are executed, subsequently followed by executing multiple backward loops, the method further comprises:

performing measurements of at least accelerations during said measurement procedure, determining said at least one apparatus parameter of working procedure movements which are indicated in said measured at least accelerations, and only based upon said measured at least accelerations, and calculating a measure of said at least one apparatus parameter only based upon one or many parameters of said accelerations, wherein said step of calculating said measure is done by applying a predetermined fit technique adapted to a type of the loop and modelling of an effect of errors on the measured acceleration.

15. The method according to claim 14, comprising controlling the movement of the measurement unit along the loop such that a constant nominal speed is commanded along the loop motion.

16. The method according to claim 14, comprising:

measuring by said at least one sensor member also angular rates during said measurement procedure, generating at least one sensor signal in dependence thereto, and applying said at least one sensor signal to said processing unit, the method further comprises determining said at least one apparatus parameter of working procedure movements which are indicated in said measured accelerations and said measured angular rates, and only based upon said measured at least accelerations and said measured angular rates, and calculating a measure of said at least one apparatus parameter only based upon one or many parameters of said accelerations and said angular rates.

17. The method according to claim 16, wherein said sensor member comprises a triaxle acceleration measurement arrangement and a triaxle angular rate measurement arrangement and the method comprises providing six degrees of freedom information along the loop trajectory.

18. The method according to claim 14, comprising performing said calculation by applying a predetermined fit technique adapted to the type of loop and modelling of the effect of errors on the measured acceleration to connect a fit, resulting from applying the predetermined fit technique, to an actual apparatus parameter.

19. The method according to claim 14, wherein the arranging includes arranging such that the at least one measurement unit, during a measurement procedure, is repetitively moved in a circular loop.

20. The method according to claim 19, wherein the predetermined fit technique is a sine-wave-fit technique, and the calculating said measure includes applying the sine-wave-fit technique to determine a frequency, and/or amplitude and/or phase difference indicative of apparatus parameter.

* * * * *